(12) United States Patent
Heren

(10) Patent No.: US 7,051,763 B2
(45) Date of Patent: May 30, 2006

(54) FAUCET ADAPTER

(75) Inventor: Lawrence Heren, East Peoria, IL (US)

(73) Assignee: L.R. Nelson Corporation, Peoria, IL (US)

( * ) Notice: Subject to any disclaimer, the term of this patent is extended or adjusted under 35 U.S.C. 154(b) by 152 days.

(21) Appl. No.: 10/837,376

(22) Filed: Apr. 30, 2004

(65) Prior Publication Data

US 2005/0241706 A1    Nov. 3, 2005

(51) Int. Cl.
*F16K 11/10*    (2006.01)

(52) U.S. Cl. ...................... 137/883; 251/152

(58) Field of Classification Search ........... 137/883; 251/148, 150, 151, 152
See application file for complete search history.

(56) References Cited

U.S. PATENT DOCUMENTS

| | | | |
|---|---|---|---|
| 1,099,713 A | 6/1914 | Morris | |
| 1,750,485 A | 3/1930 | Muller, Jr. | |
| 2,598,961 A * | 6/1952 | Andrus | 137/883 |
| 3,567,259 A | 3/1971 | Benson et al. | |
| 3,779,509 A * | 12/1973 | Vandenbroek | 251/148 |
| 4,776,369 A * | 10/1988 | Lardner et al. | 137/515.5 |
| 5,197,711 A * | 3/1993 | Geiger et al. | 251/152 |
| 5,316,264 A * | 5/1994 | Newman et al. | 251/150 |
| 5,429,151 A * | 7/1995 | Millett et al. | 137/315.18 |
| 5,879,029 A | 3/1999 | Wilks | |
| 6,047,729 A | 4/2000 | Hollister et al. | |
| 6,321,782 B1 | 11/2001 | Hollister | |
| 6,575,429 B1 * | 6/2003 | Paine | 251/148 |

* cited by examiner

*Primary Examiner*—John Fox
(74) *Attorney, Agent, or Firm*—Brinks Hofer Gilson & Lione

(57) ABSTRACT

A faucet adapter including, without limitation: a valve body having a valve; an inlet end coupled to the valve body for connection to a faucet; a tubular member having an outlet end and a coupling end; and a coupling connection for coupling the tubular member to the valve body; wherein the coupling connection includes, without limitation: a barbed shank inserted into an end of the tubular member opposite the outlet end; a body member for enclosing the valve body and pressing the tubular member against the barbed shank; and a retaining ring.

26 Claims, 3 Drawing Sheets

FAUCET ADAPTER

BACKGROUND OF THE INVENTION

1. Field of the Invention

The present invention relates to a faucet adapter. Particularly, the present invention is directed to a faucet adapter for lawn and garden applications that provides integral flow control and is resistant to kinks.

2. Description of Related Art

Faucet adapters for lawn and garden applications are known in the art. According to one embodiment of prior faucet adapters, a relatively short portion of hose is coupled at one end to a faucet while the other end is coupled to a hose. These adapters may include such features as metal coils around the adapter to prevent kinks. Kinks are undesirable because they restrict flow from the faucet to the hose and ultimately to the sprinkling or watering implement attached to the hose.

Other faucet adapters include flow control devices that are attached to a faucet. These devices usually comprise some inlet, a valve body, and one or more outlets. In some embodiments, a valve is provided for each outlet to control, for example, multiple sprinkling devices off of the same faucet.

However, the prior art lacks any acceptable faucet adapter which incorporates both a flow control valve and flexible tubing that is resistant to kinks. In particular, the prior art does not include a faucet adapter that provides a strong enough coupling between a flexible tubular member and a valve body to prevent failure of the coupling when a stress is placed on the tubular member. Embodiments of the present invention address these limitations in the prior art.

SUMMARY OF THE INVENTION

The purpose and advantages of the present invention will be set forth in and apparent from the description that follows, as well as will be learned by practice of the invention. Additional advantages of the invention will be realized and attained by as particularly pointed out in the written description and claims hereof, as well as from the appended drawings.

It is an object of embodiments of the invention to unified flow control valve and flexible tubular member.

To achieve these and other advantages and in accordance with the purpose of the invention, as embodied and broadly described, embodiments of the invention include a faucet adapter comprising: a valve body comprising a valve; an inlet end coupled to the valve body for connection to a faucet; a tubular member having an outlet end and a coupling end; and a coupling connection for coupling the tubular member to the valve body; wherein the coupling connection comprises: a barbed shank inserted into an end of the tubular member opposite the outlet end; a body member for enclosing the valve body and pressing the tubular member against the barbed shank; and a retaining ring.

The invention also includes a dual faucet adapter having all of the features of the above summarized embodiment. The invention also includes embodiments comprising a tubular member resistant to kinks.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the preferred embodiments of the invention. Together with the description, the drawings serve to explain the principles of the invention.

DETAILED DESCRIPTION OF THE PREFERRED EMBODIMENT

Figure 1:
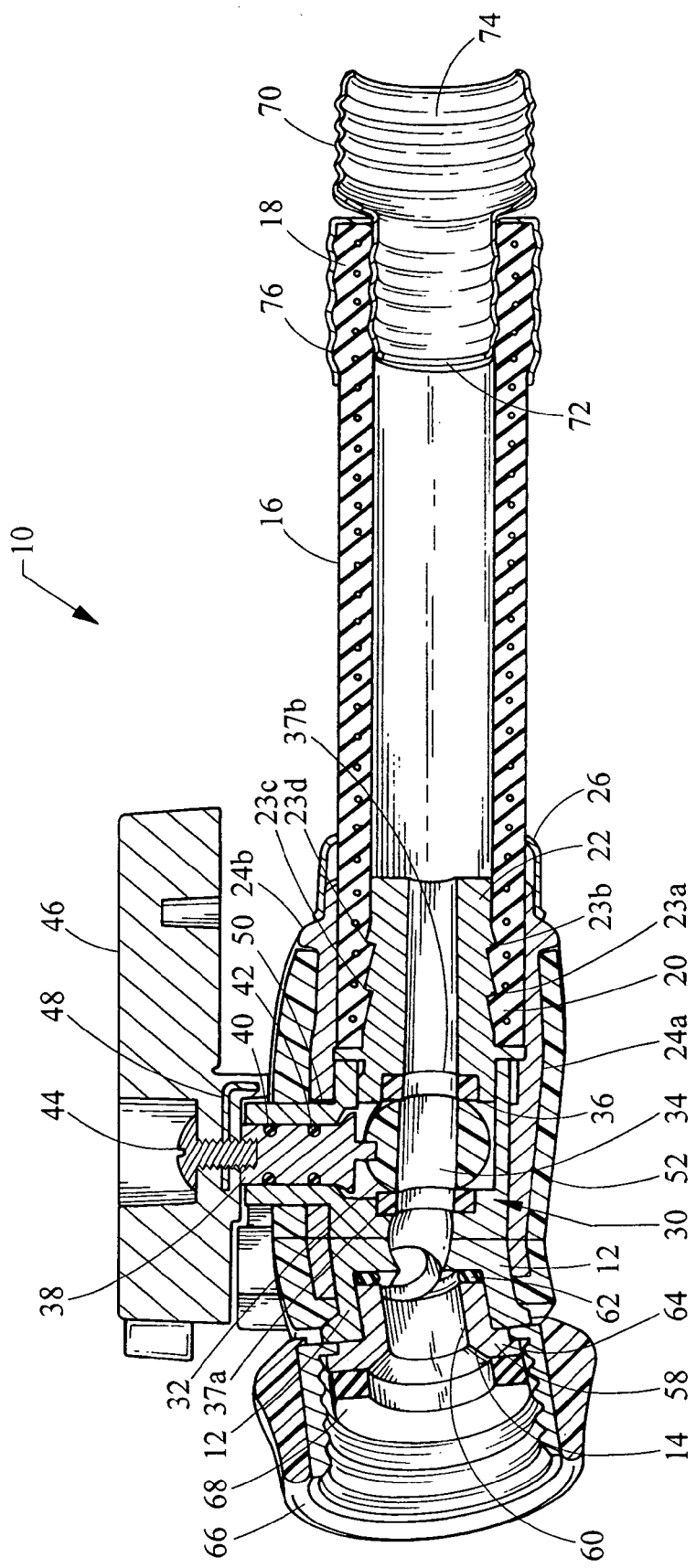
FIG. 1 is a cross section view of an embodiment of the present invention.

Reference will now be made in detail to the present preferred embodiments of the invention, examples of which are illustrated in the accompanying drawings.

The preferred embodiments of the present invention presented herein may be used for providing an integrated flow control and flexible connection between a hose and a faucet. The present invention is particularly suited for outdoor lawn and garden applications wherein a hose is to be fluidly coupled to a faucet and wherein flow control may be desired and kinking of the hose is to be avoided. For purpose of explanation and illustration, and not limitation, an exemplary embodiment of the adapter in accordance with the invention is shown in FIG. 1 and is designated generally by reference character 10.

Figure 2:
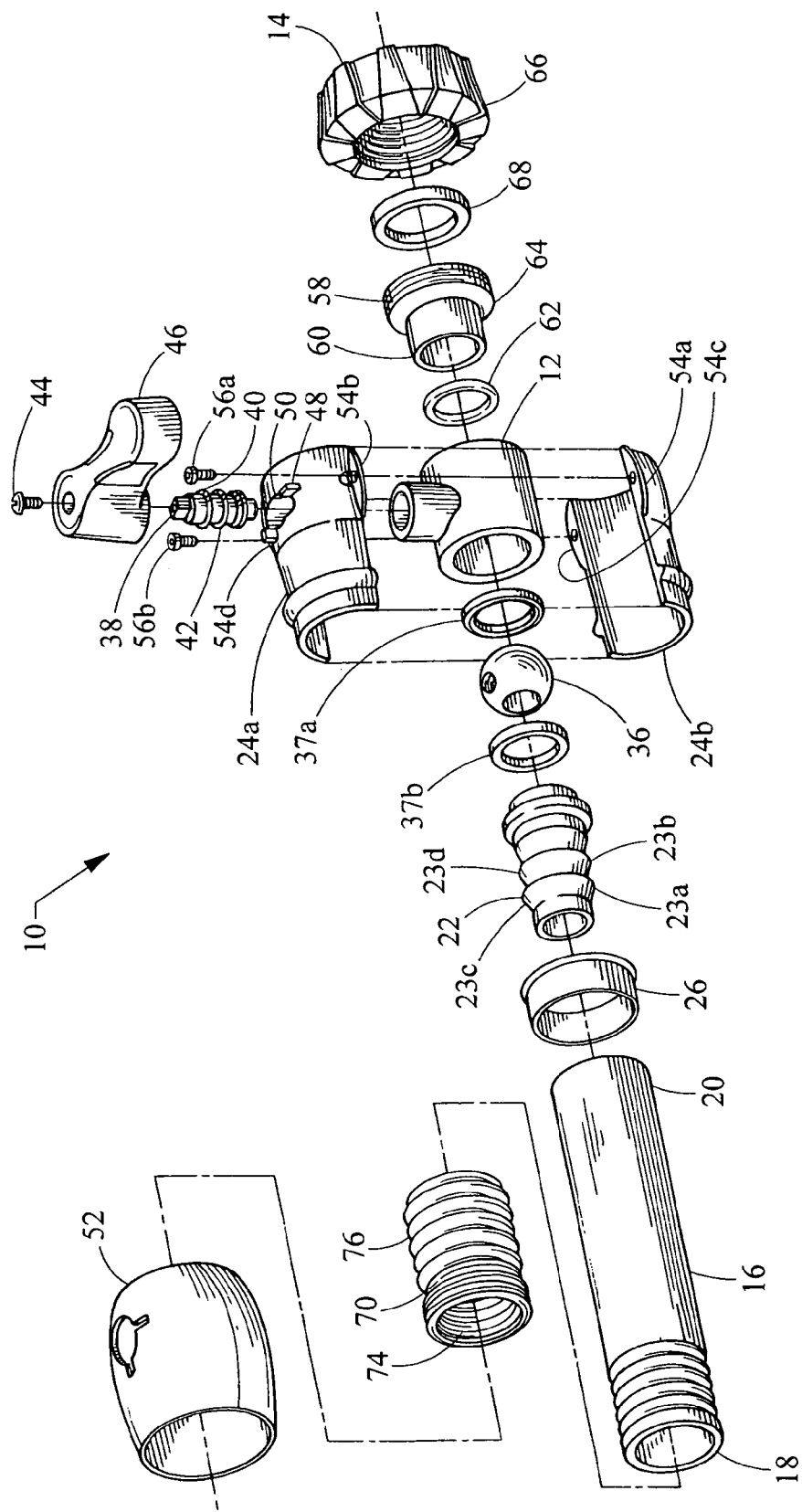
FIG. 2 is an exploded view of the faucet adapter depicted in FIG. 1.

As shown in FIGS. 1 and 2, the adapter 10 generally comprises a valve body 12 comprising a flow control means, such as a valve, as described more fully below. The adapter further comprises an inlet end 14 for connection to a faucet (not shown) and a tubular member 16 having an outlet end 18 and a coupling end 20. The coupling end 20 is coupled to the valve body 12 via a coupling means comprising, in the preferred embodiment, a coupling connection described below. In particular, the coupling connection generally comprises a barbed shank 22 inserted into the coupling end 20 of the tubular member 16. The barbed shank 22 comprises outwardly protruding barbs 23a, 23b, 23c and 23d to engage the tubular member 16. The coupling connection further generally comprises a body member comprised of two nearly identical half-sections 24a, 24b encasing the valve body 12 which are pressed together and press the tubular member 16 against the barbed shank 22. A retaining ring 26 is further preferably provided to further press the tubular member 16 between the half-sections 24a, 24b and the barbed shank 22.

The structure associated with the flow control means may be a ball valve, as herein described, or a diaphragm-type valve as described in U.S. Pat. No. 6,659,373, entitled "One Touch Actuated Valve" and assigned to L.R. Nelson Corporation, incorporated herein by reference, and their equivalents.

The ball valve 30 comprises a ball port 32. The ball port 32 has a hollow opening 34 to fluidly couple the inlet end 14 with the tubular member 16 when in an open position. The ball port 32 is seated in a seat 36 formed in one end of the barbed shank 22. Sealing o-rings 37a, 37b are provided at opposite ends of the ball port 32. The ball port 32 is connected to a knob shank 38 which will rotate the ball port 32 between an open and closed position. The knob shank 38 is preferably provided with o-ring seals 40, 42 to prevent leakage. The knob shank 36 is engaged by a screw 44 which couples the shank 38 to a flow control knob 46 which extends outside the half-section 24b through an opening 50. A stop 48 may be provided to prevent over-rotation of the knob 46. An insulating overmold 52, such as rubber, preferably covers the valve body 12.

The half-sections 24a and 24b may be pressed together in a variety of ways, including welding and mechanical attachment, such as through screws or nuts and bolts or locking clips, or other equivalent connection. In one embodiment, shown in FIG. 2, flanges 54a, 54b, 54c and 54d are provided extending from the perimeter of the half-sections 24a, 24b, respectively, in the longitudinal direction. Screws 56a, 56b are threaded through the flanges to tightly press the half-sections 24a, 24b together.

The inlet end 14 of the adapter 10 preferably comprises a separate portion 58 having a short cylindrical section 60 extending outwardly therefrom towards the valve body 12. The cylindrical section 60 seats in the valve body 12 with an o-ring seal 62. The portion 58 further comprises a flange 64 around the inlet end thereof, the flange 64 engaging a threaded overmolded nut 66 having a hose washer 68 therein. The threaded overmolded nut 66 engages the faucet (not shown). The outlet end 18 of the tubular member 16 preferably comprises a shank 70 having a ribbed cylindrical protrusion 72 for insertion into the end of the tubular member. A ribbed cylindrical retaining ferrule 76 is provided to engage the tubular member against the protrusion 72. The shank 70 has threading 74 for attachment to, for example, a garden hose or other lawn and garden product.

Preferably, the tubular member 16 is provided in such a way so as to resist kinks. In the preferred embodiment, a stiff, high quality hose section, such as of a hydraulic grade or thick industrial hose, is used. In alternative embodiments, a metal spring can be wrapped around the hose section to resist kinking. In yet further embodiments, the hose may be integrally made with a metal spring as part of the hose construction.

Figure 3:
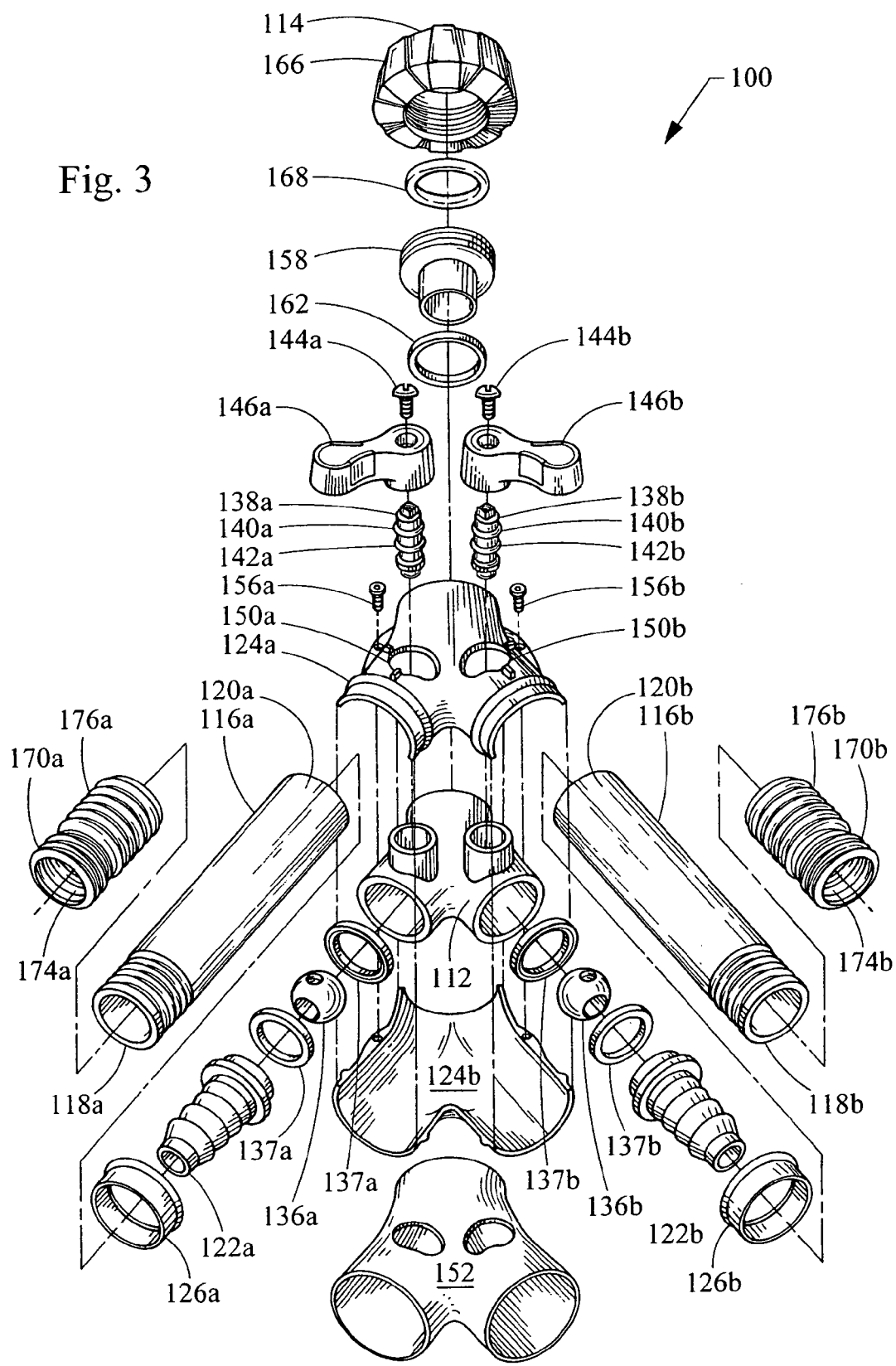
FIG. 3 is an exploded view of a dual adapter in accordance with an embodiment of the invention.

The present invention is susceptible to various advantageous embodiments. For example, the valve body 12 and all of its component parts may be made of either metal or plastic. In addition, the present invention is capable of being embodied in a dual adapter 100, as depicted in FIG. 3. The dual adapter comprises substantially the same parts as the adapter 10 depicted above, except that the valve body 112 comprises two flow control means. In the present preferred embodiment, the flow control means includes two ball valves, each substantially as described above. The half-sections 124a and 124b are adapted to fit the dual valve body 112 and therefore contain two openings 150, 150b and are provided with a pair of knobs 146a, 146b to operate each flow control means individually. Two tubular members, 116a, 116b are provided, as well as two coupling mean, each substantially described as above with barbed shanks 122a, 122b and retaining rings 126a, 126b. The dual adapter thus provides a single inlet 114 and two outlets 118a, 118b for connection of multiple lawn and garden products.

It will be apparent to those skilled in the art that various modifications and variations can be made in the depicted embodiments of the present invention without departing from the spirit or scope of the invention. Thus, it is intended that the present invention include modifications and variations that are within the scope of the appended claims and their equivalents.

What is claimed is:

1. A faucet adapter comprising:
   a valve body comprising a valve;
   an inlet end coupled to the valve body for connection to a faucet;
   a tubular member having an outlet end and a coupling end; and
   a coupling connection for coupling the tubular member to the valve body;
   wherein the coupling connection comprises:
      a barbed shank inserted into an end of the tubular member opposite the outlet end;
      a body member for enclosing the valve body and pressing the tubular member against the barbed shank; and
      a retaining ring.

2. The faucet adapter of claim 1 wherein the body member comprises two half-sections pressed together.

3. The faucet adapter of claim 1 wherein the adapter is a dual adapter comprising two valves in the valve body, two tubular members and two coupling connections.

4. The faucet adapter of claim 1 wherein the valve is a ball valve.

5. The faucet adapter of claim 2 wherein the two half-sections are welded together.

6. The faucet adapter of claim 2 wherein the two half-sections are pressed together with a mechanical connection.

7. The faucet adapter of claim 1 wherein the valve body further comprises an insulated overmold.

8. The faucet adapter of claim 1 wherein the inlet end comprises a threaded connection.

9. The faucet adapter of claim 1 wherein the outlet end comprises a threaded connection.

10. The faucet adapter of claim 1 wherein the tubular member is resistant to kinks.

11. The faucet adapter of claim 4 wherein the barbed shank has an end opposite the tubular member adapted to position the ball valve.

12. The faucet adapter of claim 1 wherein the tubular member is flexible.

13. A faucet adapter comprising:
    a valve body comprising a flow control means;
    an inlet end coupled to the valve body for connection to a faucet;
    a tubular member having an outlet end and a coupling end; and
    a means for coupling the tubular member to the valve body.

14. The faucet adapter of claim 13 wherein the coupling means comprises:
    a barbed shank inserted into an end of the tubular member opposite the outlet end;
    a body member for enclosing the valve body and pressing the tubular member against the barbed shank; and
    a retaining ring.

15. The faucet adapter of claim 13 wherein the flow control means comprises a ball valve.

16. The faucet adapter of claim 13 wherein the flow control means comprises a diaphragm-type valve.

17. The faucet adapter of claim 14 wherein the body member comprises two half-sections pressed together.

18. The faucet adapter of claim 14 wherein the adapter is a dual adapter comprising two valves in the valve body, two tubular members and two coupling means.

19. The faucet adapter of claim 17 wherein the two half-sections are welded together.

20. The faucet adapter of claim 17 wherein the two half-sections are pressed together with a mechanical connection.

21. The faucet adapter of claim 13 wherein the valve body further comprises an insulated overmold.

22. The faucet adapter of claim 13 wherein the inlet end comprises a threaded connection.

23. The faucet adapter of claim 13 wherein the outlet end comprises a threaded connection.

24. The faucet adapter of claim 13 wherein the tubular member is resistant to kinks.

25. The faucet adapter of claim 14 wherein the barbed shank has an end opposite the tubular member adapted to position a ball for a ball valve.

26. The faucet adapter of claim 13 wherein the tubular member is flexible.

* * * * *